(12) United States Patent
Park

(10) Patent No.: US 7,567,025 B2
(45) Date of Patent: Jul. 28, 2009

(54) PLASMA DISPLAY PANEL APPARATUS WITH A FILM FILTER ON PANEL

(75) Inventor: Yu Park, Seoul (KR)

(73) Assignee: LG Electronics Inc., Seoul (KR)

( * ) Notice: Subject to any disclaimer, the term of this patent is extended or adjusted under 35 U.S.C. 154(b) by 494 days.

(21) Appl. No.: 11/314,821

(22) Filed: Dec. 22, 2005

(65) Prior Publication Data

US 2006/0138924 A1 Jun. 29, 2006

(30) Foreign Application Priority Data

Dec. 23, 2004 (KR) .................. 10-2004-0110881
Dec. 23, 2004 (KR) .................. 10-2004-0110882
Dec. 29, 2004 (KR) .................. 10-2004-0115702

(51) Int. Cl.
*H01J 61/40* (2006.01)
*H01J 17/49* (2006.01)
*H01K 1/26* (2006.01)

(52) U.S. Cl. ............... 313/310; 313/110; 313/112; 313/582

(58) Field of Classification Search ............... None
See application file for complete search history.

(56) References Cited

U.S. PATENT DOCUMENTS

| 5,831,374 | A | 11/1998 | Morita et al. | |
|---|---|---|---|---|
| 6,965,191 | B2 * | 11/2005 | Koike et al. | 313/112 |
| 2004/0090182 | A1 * | 5/2004 | Cha | 313/582 |
| 2005/0017620 | A1 * | 1/2005 | Kim et al. | 313/112 |

FOREIGN PATENT DOCUMENTS

| EP | 0 999 536 A1 | 5/2000 |
|---|---|---|
| EP | 1 267 318 A1 | 12/2002 |
| EP | 1 429 366 A1 | 6/2004 |
| EP | 1 489 588 A2 | 12/2004 |
| JP | 09-171353 | 6/1997 |
| JP | 2002-251144 | 9/2002 |
| KR | 10-2002-0077410 | 10/2002 |
| KR | 10-2004-0085759 A | 10/2004 |

OTHER PUBLICATIONS

European Search Report dated Jul. 3, 2006.
Two (2) Korean Office Action dated Aug. 31, 2006.
Chinese Office Action dated Oct. 24, 2008.

* cited by examiner

*Primary Examiner*—Nimeshkumar D. Patel
*Assistant Examiner*—Natalie K Walford
(74) *Attorney, Agent, or Firm*—KED & Associates, LLP

(57) ABSTRACT

Disclosed is a plasma display panel (PDP) apparatus having a film-type filter and a filter support structure for supporting and fixing the film-type filer to a panel of the PDP apparatus. The PDP apparatus includes a panel divided into a display region and a non-display region, and a film-type filter electrically connected to the non-display region of the panel via a ground layer or a grounding member. By such construction, the filter can be grounded and supported. The film-type filter has a main body part and a projected part which is provided in such a manner that at least one film among a plurality of films constituting the main body part are extended from an edge portion of the main body part. The projected part of the filter is electrically connected to a heat sink frame disposed on a rear side of the panel so that charges accumulated on the filter can be discharged out.

8 Claims, 11 Drawing Sheets

PLASMA DISPLAY PANEL APPARATUS WITH A FILM FILTER ON PANEL

BACKGROUND OF THE INVENTION

1. Field of the Invention

The present invention relates to a plasma display panel apparatus, and more particularly, to a plasma display panel apparatus having a filter for shielding electromagnetic waves and a filter support structure for supporting and fixing the filter to the panel.

2. Description of the Related Art

A plasma display panel (PDP) apparatus is an image display apparatus. The PDP apparatus includes a front substrate having a plurality of barrier ribs on it, and a rear substrate facing the front substrate where a plurality of discharge cells is formed between the front substrate and the rear substrate, by being defined by the barrier ribs. The PDP apparatus can display an image based on the principle that an inert gas discharge is generated in the discharge cell due to a high frequency voltage, and vacuum ultra violet (UV) rays emitted upon discharging excites a phosphor in the discharge cell, resulting in emission of visible light.

FIG. 1 illustrates a perspective view of a conventional plasma display panel apparatus.

Referring to FIG. 1, a discharge cell is formed between a front substrate 10 and a rear substrate 18 facing the front substrate 10 and defined by barrier ribs 24 disposed between the front substrate 10 and the rear substrate 18.

Address electrodes X are formed on the rear substrate 18, and scan electrodes Y and sustain electrodes Z are formed on the front substrate where a scan electrode Y and a sustain electrode Z constitutes an electrode pair. The address electrodes X are arranged to intersect the other electrodes Y and Z.

A lower dielectric layer 22 is formed on the rear substrate 18 having the address electrodes X thereon.

Barrier ribs 24 are disposed on the lower dielectric layer 22 to form discharge spaces there between, and prevent UV rays and visible rays generated due to the discharge from leaking into adjacent discharge spaces. A phosphor 26 is formed on the surfaces of the lower dielectric layer 22 and the barrier ribs 24.

An inert gas is injected into the discharge spaces, and UV rays generated upon gas-discharging excites the phosphor, so that visible light of any one of red, green and blue rays is emitted.

Each scan electrode Y formed on the front substrate 10 includes a transparent electrodes 12Y and a bus electrode 12Z, and each sustain electrode Z includes a transparent electrode 12Z and a bus electrode 13Z, where the bus electrode 12Z is disposed at an edge portion of a side of the transparent electrode 12Y and has a smaller width than the transparent electrode 12Y, and the bus electrode 13Z is disposed at an edge portion of a side of the transparent electrode 13Y and has a smaller width than the transparent electrode 13Y.

The transparent electrodes 12Y and 13Y and the bus electrodes 12Z and 13Z are formed to intersect the address electrodes X. The scan electrodes Y and the sustain electrodes Z are covered with an upper dielectric layer 14 and a protective film 16.

Discharge cells having the structure described above are selected by partners facing discharge between the address electrodes X and the scan electrodes Y, and the discharge of the discharge cells are sustained by surface discharge between the scan electrodes Y and the sustain electrodes Z to emit visible light.

FIG. 2 illustrates a sectional-view of a conventional filter to be attached to a front face of a plasma display panel.

Referring to FIG. 2, the filter 30 includes a near-infrared (NIR) ray shielding film 51, an electromagnetic wave shielding film 52, a glass 53, an optical characteristic film 54, and an anti-reflection (AR) film 55. Each of the films 51 to 55 of the filter 30 is adhered to adjacent films by an adhesive film. For the convenience of explanation, the adhesive films are not illustrated in figures.

The NIR shielding film 51 shields near infrared rays emitted from a plasma display panel to prevent near infrared rays beyond an allowed level from leaking outside of the panel.

The glass 53 prevents the filter being damaged due to external impact and supports the filter 30.

The optical characteristic film 54 adjusts color temperature of light incident onto the panel to improve the optical characteristic of the panel and is formed by injecting a specified substance into the adhesive film.

The AR film 55 prevents light incident onto the panel from being reflected from the panel, thereby enhancing contrast of the panel.

FIG. 3 illustrates a connection structure to connect the PDP and the conventional filter.

A panel 32 includes a front substrate 10 and a rear substrate 18 which are combined.

A casing for enclosing the panel 32 includes a front cabinet 42 and a back cover 38. A conventional PDP apparatus includes a printed circuit board (PCB) 36 for driving the panel 32, a heat sink plate 37 for sinking heat generated from the PCB 36, and a filter 31 attached to a front face of the panel.

The connection structure includes a finger spring gasket 43 for supporting the filter 30 and electrically connecting the filter to the back cover 38, a filter support member 44, and a module support member 45 for supporting a module in which a PCB 36 and the panel 32 are combined.

As described above, since the filter 30 is electrically connected to the back cover 38 via the support member 44, charges accumulated on the filter are discharged out.

However, since the filter is recently manufactured in a film type which does not include the glass 53 therein, the filter is needed to be attached to the panel 32 only by an adhesive without help of the support member 44 which electrically grounds and supports the filter.

Accordingly, a new filter support structure capable of not only fixing the film-type filter to the panel 32 but also grounding the filter should be developed.

SUMMARY OF THE INVENTION

Accordingly, it is an aspect of the present invention to provide a PDP apparatus having a filter support structure and a film-type filter, the PDP apparatus includes a panel divided into a display region and a non-display region, a film-type filter disposed on the panel, and a grounding member for electrically connecting the non-display region of the panel to the film-type filter.

The filter includes at least one film selected from the group consisting of an AR layer, an optical characteristic layer, an electromagnetic wave shielding layer, and a near infrared ray shielding layer, and the grounding member is formed as a conductive tape containing a conductive metal substance and having a resistance in the range from 0.1 to 1000Ω.

The filter further includes at least one dummy electrode formed in the non-display region and one or more grounding member for electrically connecting the dummy electrode to the filter.

The dummy electrode includes at least one dummy electrode selected from the group consisting of a first dummy electrode corresponding to a scan electrode Y, a second dummy electrode corresponding to a sustain electrode Z and a third dummy electrode corresponding to an address electrode X.

According to another aspect of the present invention, there is provided a PDP apparatus including a panel divided into a display region and a non-display region, a film-type filter formed on the panel, a ground layer formed on the non-display region, and grounding member for electrically connecting the filter to the ground layer.

The ground layer is made of a conductive metal material containing ITO, and the filter has a groove at a lower surface of the filter where the groove is mated with the ground layer.

The groove is formed by a manner that at least one film is smaller than the other films constituting the filter where a thickness of the groove is substantially the same as a thickness of the ground layer. The thickness of the groove is not greater than 1 μm and substantially the same as a thickness of the ground layer.

At least one projected part of the film-type filter acts as the grounding member.

The projected part is formed in such a manner that at least one film among an AR film, an optical characteristic film, an electromagnetic wave shielding film and an NIR shielding film, constituting the filter, is formed to be larger than the other films. The projected part is connected to the heat sink frame combined to a rear side of the panel.

The filter support structure of the PDP apparatus further includes a fixing member for fixing the projected part of the filter to the heat sink frame, and the fixing member is formed as a conductive tape.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings, in which.

Figure 1:
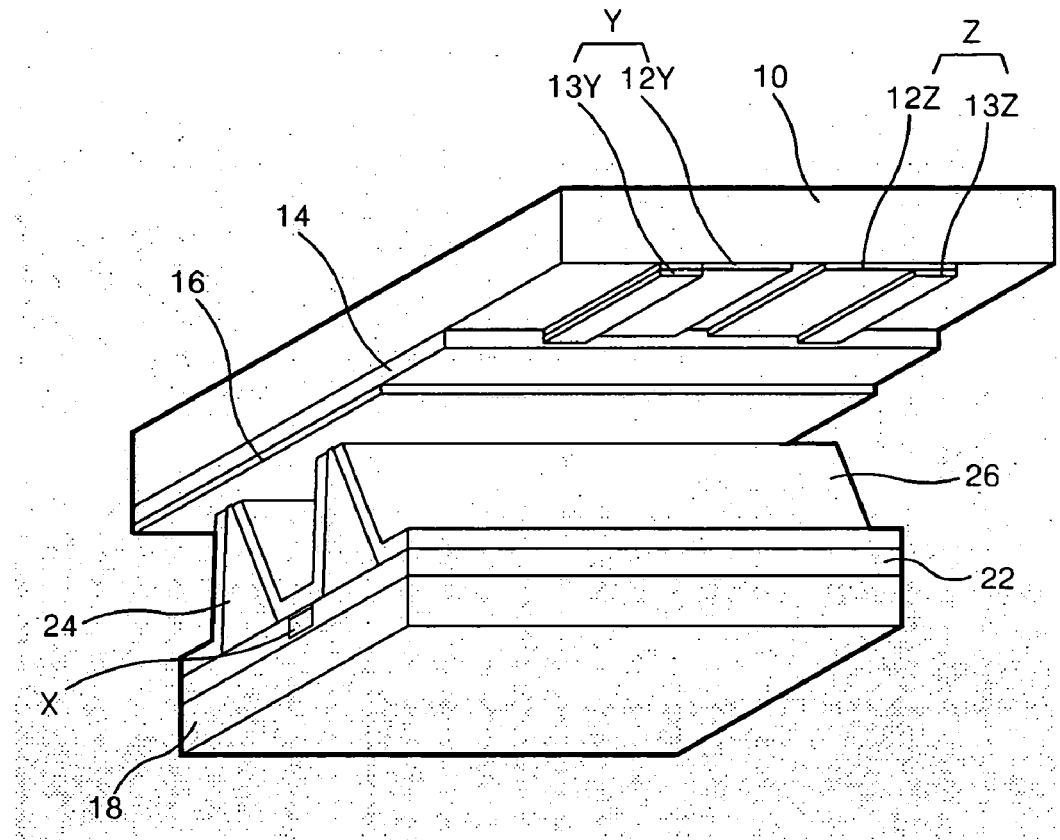
FIG. 1 is a perspective view illustrating a discharge cell of a conventional plasma display panel.
Figure 2:
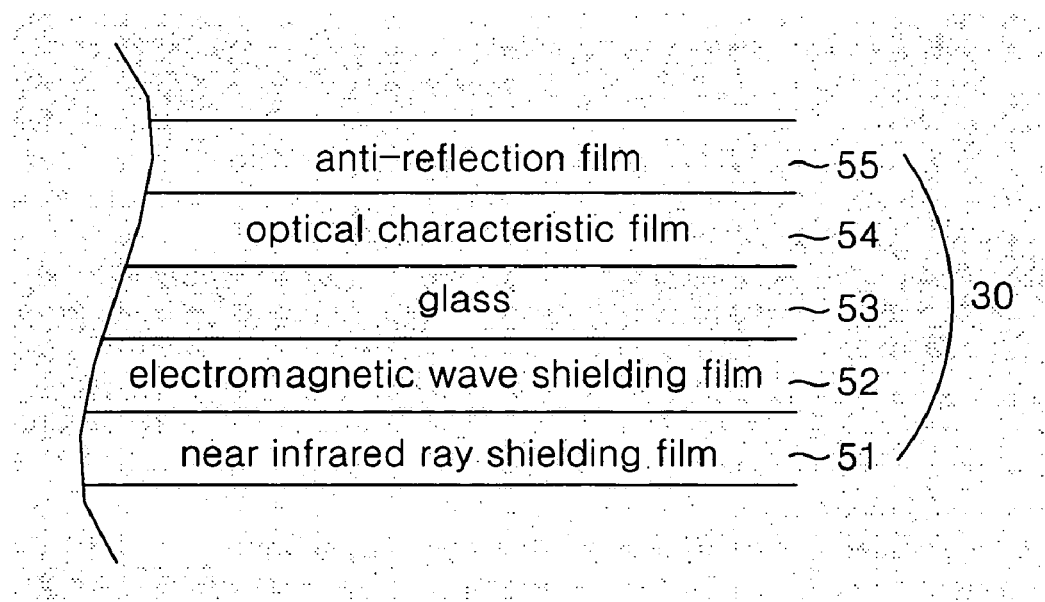
FIG. 2 is a sectional view illustrating a conventional glass filter for a plasma display panel.
Figure 3:
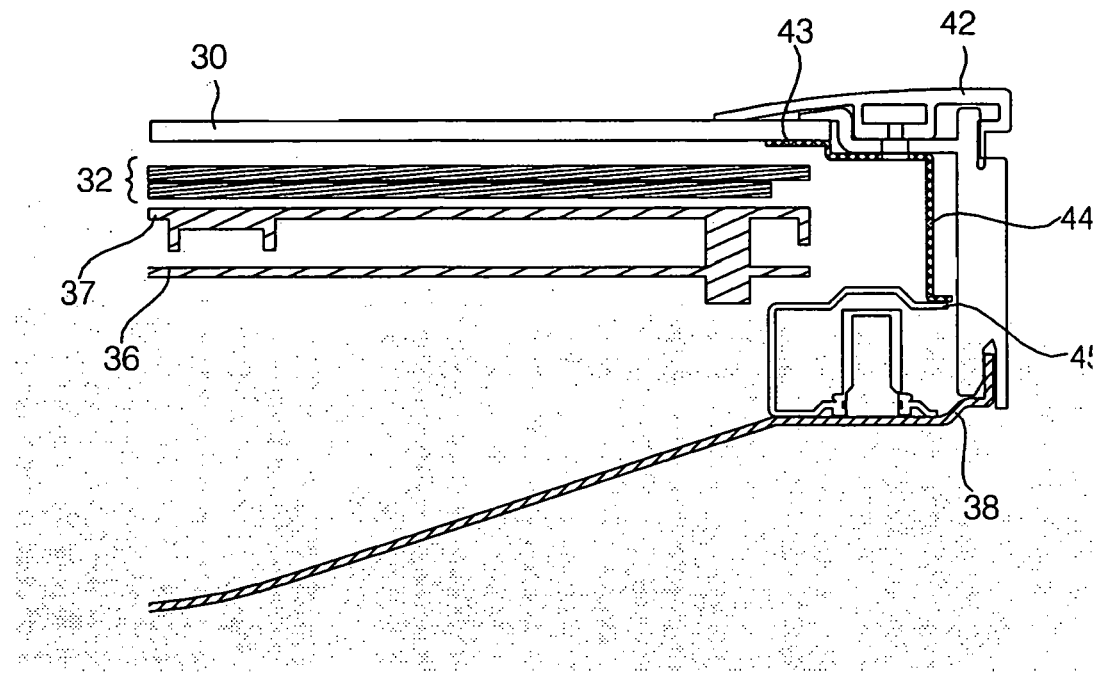
FIG. 3 is a sectional view illustrating a side of a conventional display panel.

DETAILED DESCRIPTION OF THE ILLUSTRATIVE, NON-LIMITING EMBODIMENTS OF THE INVENTION

Reference will now be made in detail to the embodiments of the present invention, examples of which are illustrated in the accompanying drawings, wherein like reference numerals refer to like elements throughout. The embodiments are described below so as to explain the present invention by referring to the figures.

Hereinafter, a filter support structure of a film-type filter and a plasma display panel (PDP) apparatus according to embodiments of the present invention will be described with reference to figures.

There is a plurality of PDP apparatus according to embodiments of the present invention. Hereinafter, the PDP apparatus according to the most preferable embodiment will be described. In the PDP apparatus of the present invention, a basic structure of a PDP panel is the same as in the conventional PDPs. Accordingly, description on the structure of the PDP will be omitted.

Figure 4:
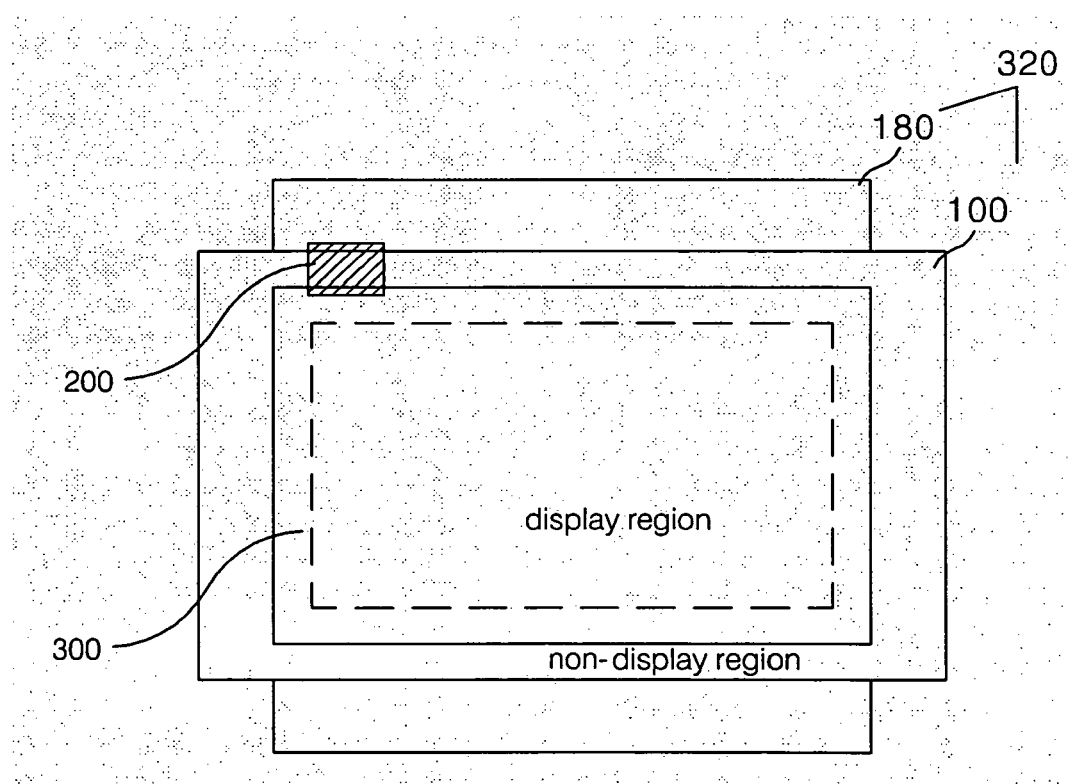
FIG. 4 is a view illustrating a plasma display panel apparatus according to a first embodiment of the present invention.

FIG. 4 illustrates a PDP apparatus according to a first embodiment of the present invention. The first embodiment is characterized in that a filter 300 is a film type and a non-display region of a panel 320 is electrically connected to the filter 300 via a grounding member 200.

The panel 320 is structured such that a front substrate 100 and a rear substrate 180 are combined with each other. The panel 320 has a display region on which an image is displayed and a non-display region which is disposed on an edge portion of the panel 320 and on which an image is not displayed and The film-type filter 300 is electrically connected to the non-display region of the panel 320 via the grounding member 200, thereby being grounded.

The grounding member 200 in the PDP apparatus according to the first embodiment is formed of a material containing a conductive metal substance such as silver (Ag) or copper (Cu) and preferably having a resistance ranging from 0.1 to 1000 Ω so that charges accumulated on the panel 320 can be effectively erased.

For example, the grounding member 200 may be formed as a conductive tape having a resistance ranging from 0.1 to 1000 Ω, and the film-type filter is connected to the non-display region of the panel 320 via the conductive tape and fixed to the panel.

Figure 5:
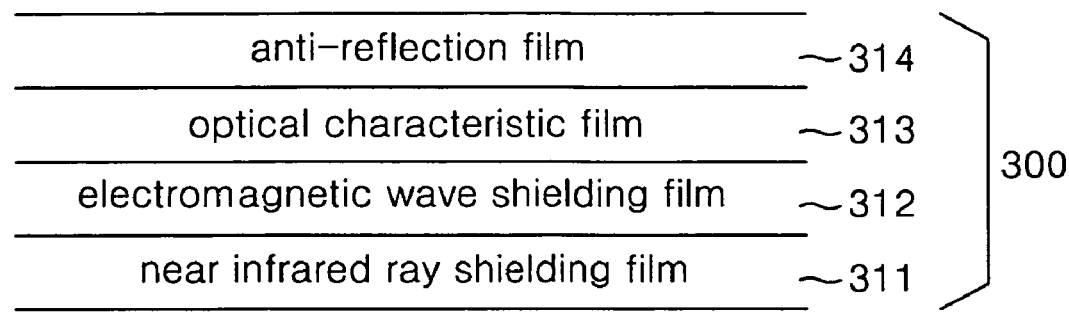
FIG. 5 is a sectional view illustrating a film-type filter according to the present invention.

FIG. 5 illustrates a sectional view of a film-type filter attached to the panel of the PDP apparatus according to the present invention.

The film-type filter 300 includes at least one film selected among an NIR shielding film 311, an electromagnetic wave shielding film 312, an optical characteristic film 313 and an AR film 314.

The NIR shielding film 311 shields NIR generated from the panel 300, and the electromagnetic wave shielding film 312 prevents electromagnetic waves being emitted from the panel where the NIR shielding film 311 and the electromagnetic wave shielding film 312 can be implemented as one film. That is, one hybrid can act as the NIR shielding film as well and the electromagnetic wave shielding film.

The optical characteristic film 313 adjusts color temperature of light emitted from and incident onto the filter to improve optical characteristic of the panel, and the AR film 314 is formed on the surface of the film-type filter 300 to prevent light onto the panel from being reflected from the surface of the panel.

Adhesive layers are provided every between the films 311 to 314 constituting the filter 300 so that the films are securely glued to each other. The adhesive layers are not shown in figures and the order of the stacked films 311 to 314 are not limited to as illustrated in figures but may vary. The AR layer 314 can be additionally provided on a rear surface of the panel.

Figure 6:
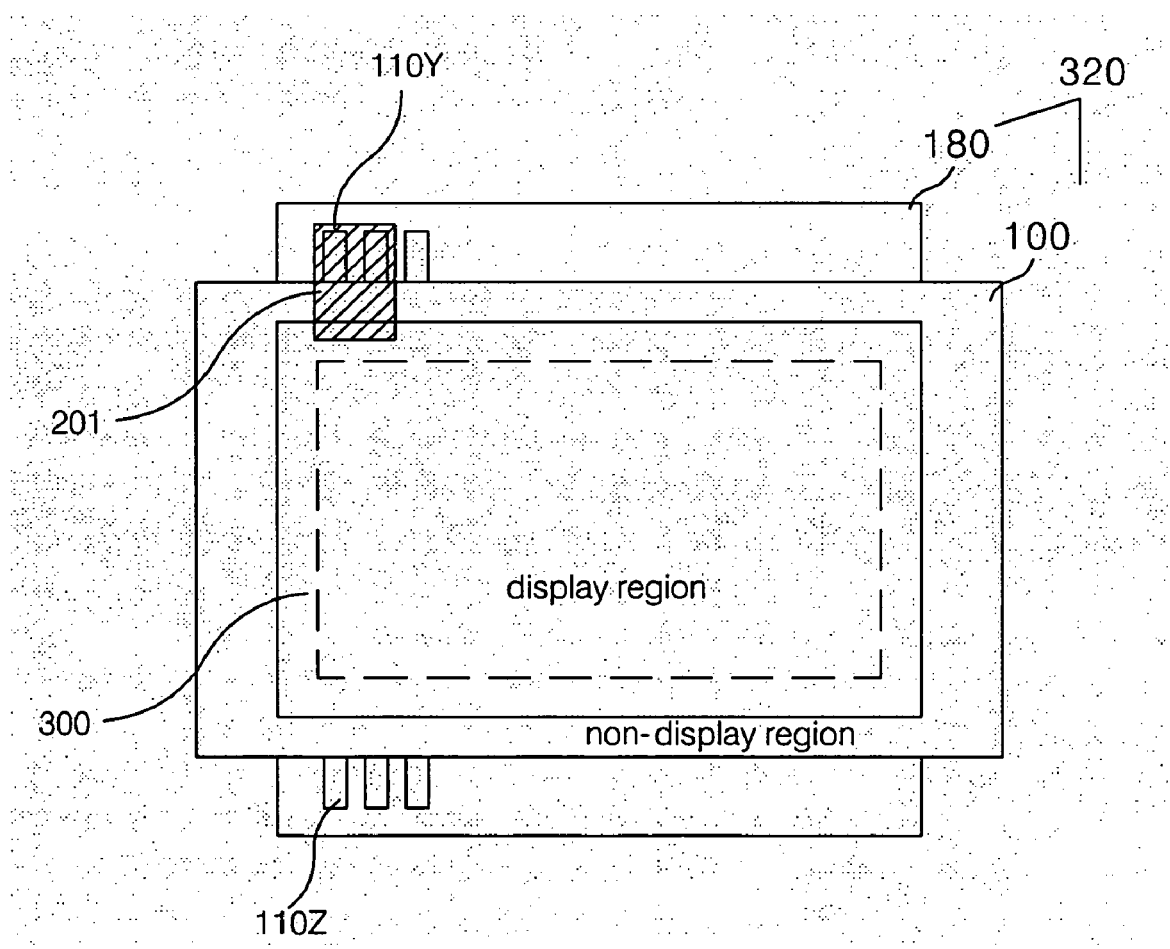
FIG. 6 and FIG. 7 are plan views illustrating a plasma display panel apparatus according to a second embodiment of the present invention.
Figure 7:
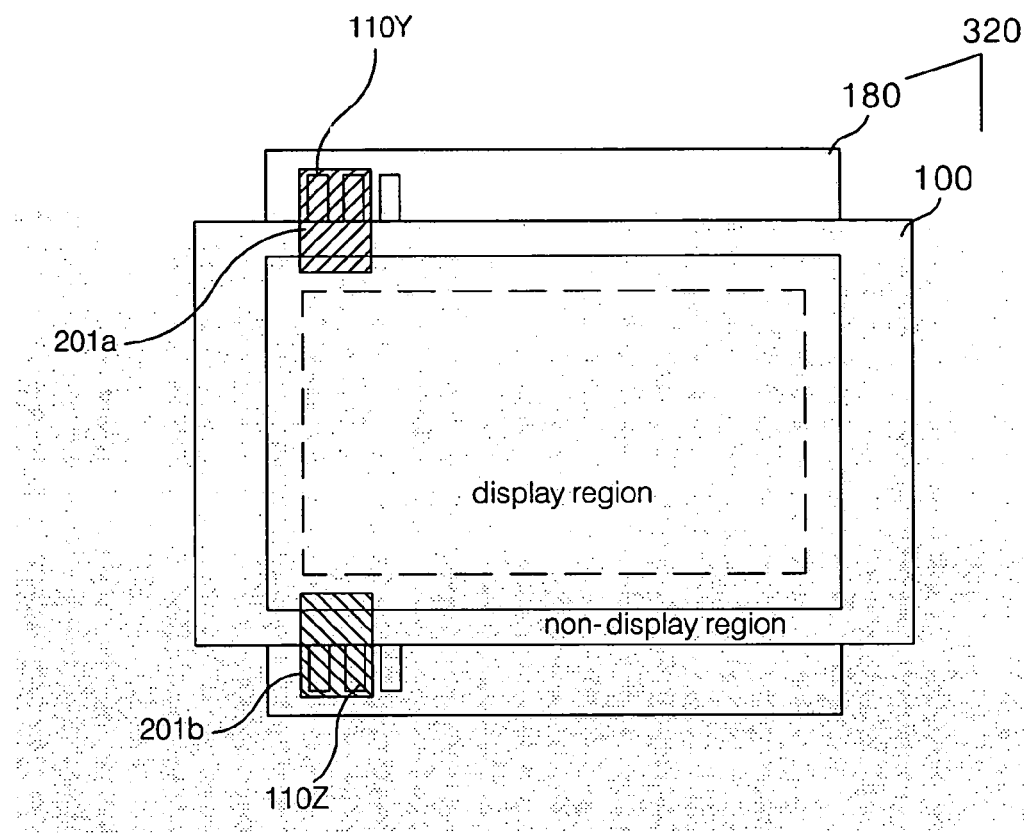

FIG. 6 and FIG. 7 illustrate a PDP apparatus according to a second embodiment of the present invention. A panel of the PDP apparatus includes one or more dummy electrodes 110Y and 110Z in a non-display region thereof, and the dummy electrodes 110Y and 110Z are electrically connected to a film-type filter by a grounding member 201.

The dummy electrodes 110Y and 10Z are structured to extend outward from the border of the display region of the panel or an edge of a substrate of the panel so that the panel 320 is electrically connected to a driving circuit. The dummy electrode includes at least one dummy electrode selected from the group consisting of a first dummy electrode 110Y corresponding to a scan electrode Y formed on a front substrate 100, a second dummy electrode 110Z corresponding to a sustain electrode Z formed on the front substrate 100, and a third dummy electrode corresponding to an address electrode formed on a rear substrate.

The grounding member 201 is in contact with the film-type filter 300 at one end and in contact with some of the dummy electrodes among the plurality of dummy electrodes 110Y and 110Z at the other end so that charges accumulated on the filter 300 are released outside the panel through the dummy electrodes 110Y and 110Z.

The grounding member 201 is formed of a material containing a conductive metal such as silver (Ag) and copper (Cu) and may be implemented by a conductive tape having a resistance in the range from 0.1 to 1000Ω.

The film-type filter 300 comprises one or more films among a NIR shielding film 311, an electromagnetic wave shielding film 312, an optical characteristic film 323 and an AR film.

On the other hand, the grounding member 201 can be electrically connected to some numbers of the dummy electrodes 110Y and 110Z and in contact with the filter 300 on the non-display region, or the grounding member 201 can be electrically in contact with the filter 300 over its entire area by being structured to have the similar size with the filter 300.

The grounding members 201, 201a and 201b are formed on the non-display region of one or more sides of the panel. That is, as illustrated in FIG. 6, the grounding member 201 can be formed on a side of the panel 320 or as illustrated in FIG. 7, the grounding member 201 can be formed on both sides of the panel 320.

If the panel 320 is driven by a double scanning method which divides the scan electrode Y/the sustain electrode Z and the address electrode X into upper and lower electrodes for driving in order to decrease an address period, as illustrated in FIG. 7, charges remaining on the filter 300 are released by the dummy electrode 110Y of the scan electrode Y and the dummy electrode 110Z of the scan electrode Z electrically connected to the filter 300.

As described above, in the PDP apparatus according to the second embodiment of the present invention, since the dummy electrodes 110Y and 110Z extending from the electrodes Y and Z, respectively formed on the panel are electrically connected to the filter 300 via the grounding member 201, the filter 300 can be fixed to the panel 320 and electromagnetic waves accumulated on the filter 300 can be erased.

Figure 8:
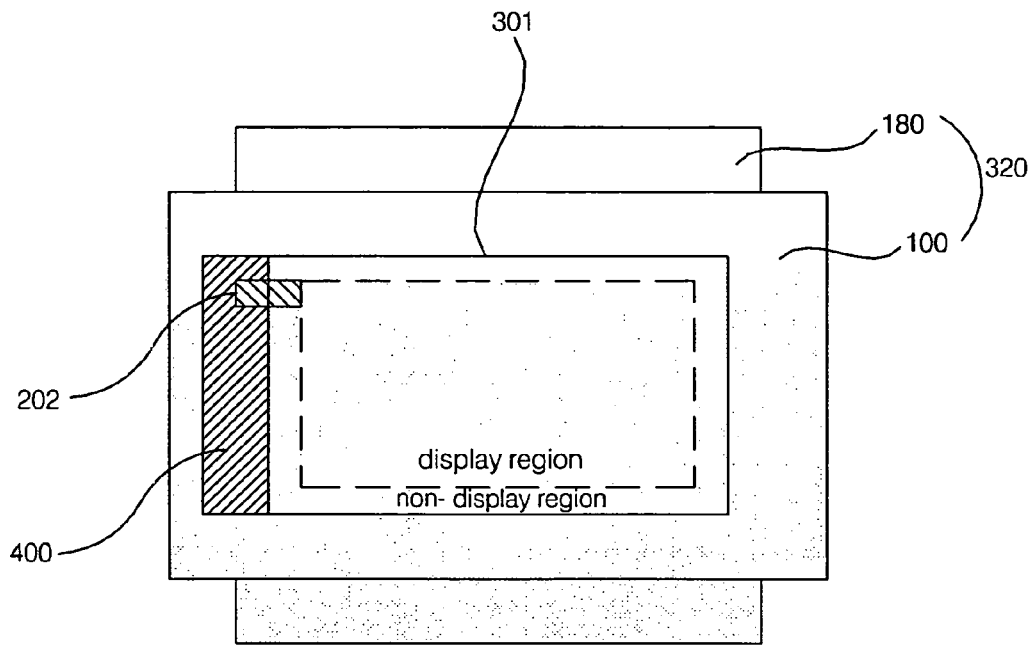
FIG. 8 and FIG. 9 are plan views illustrating a plasma display panel apparatus according to a third embodiment of the present invention.
Figure 9:
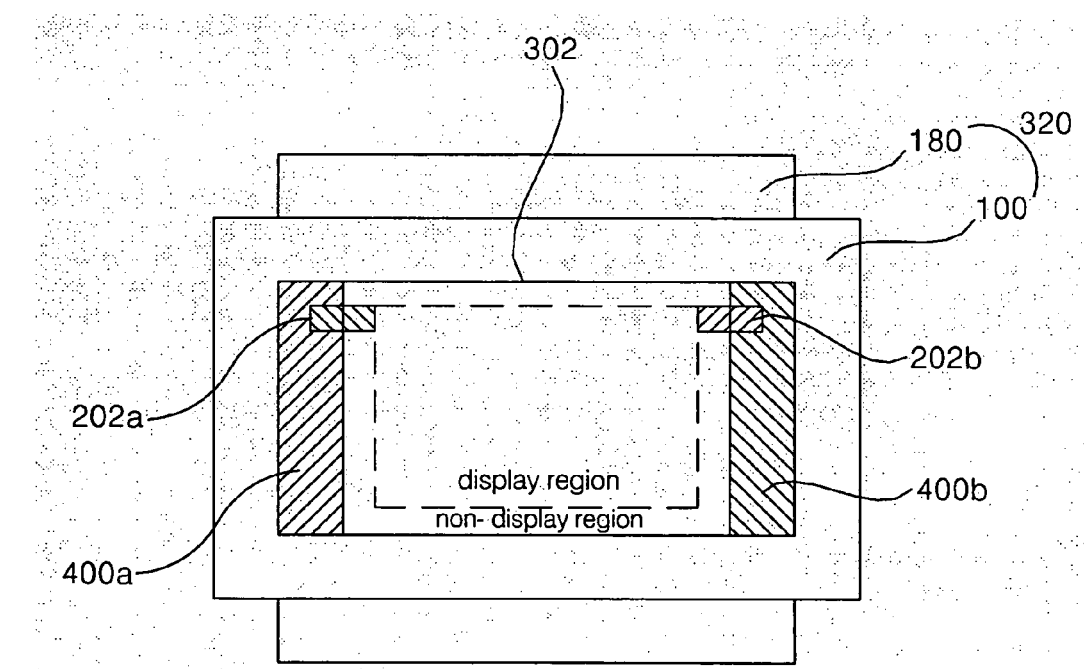
Figure 10:
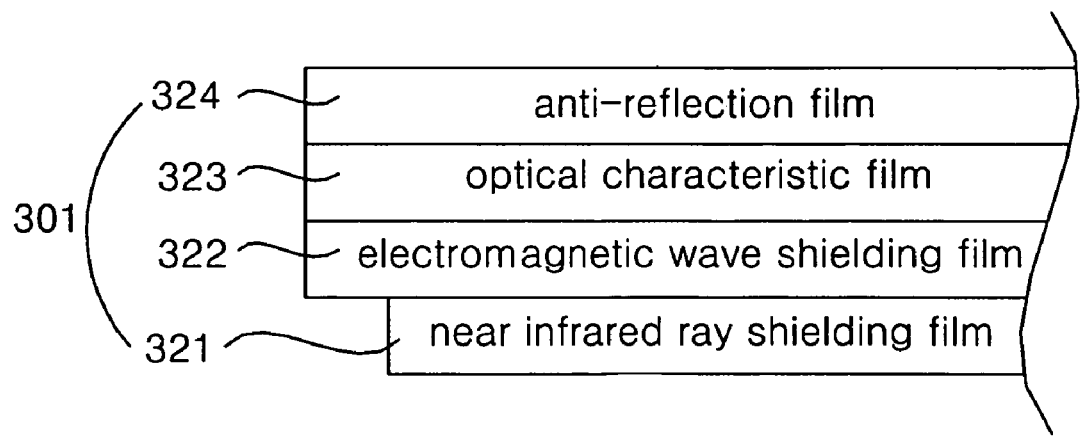
FIG. 10 is a sectional view illustrating a film-type filter applied to the plasma display panel apparatus according to the third embodiment of the present invention.
Figure 11:
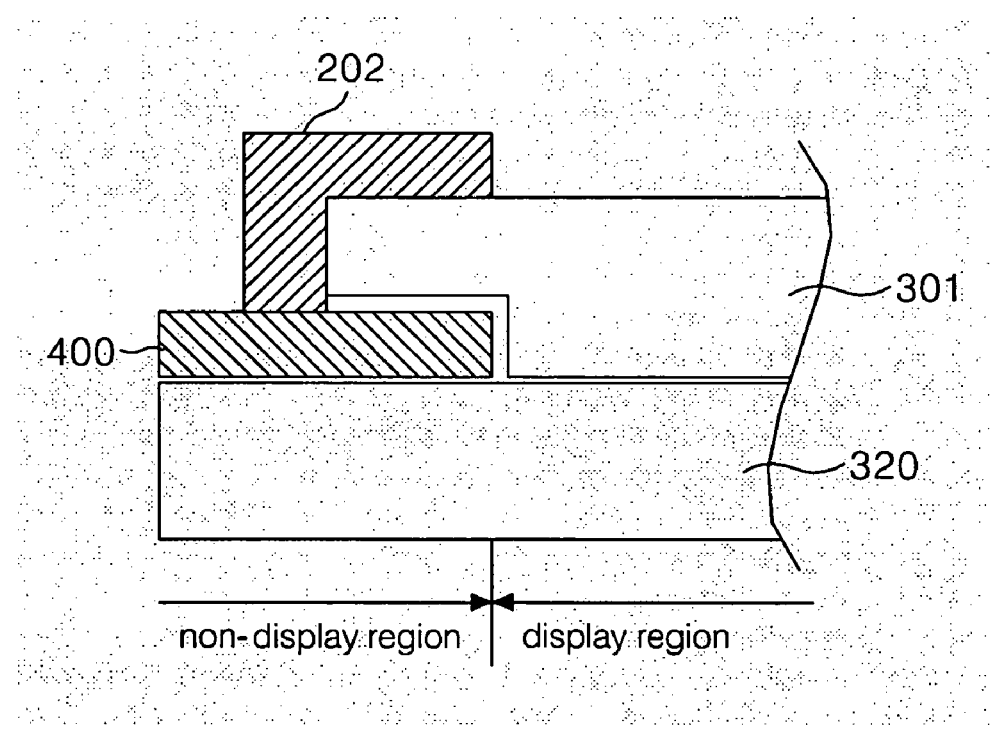
FIG. 11 is a sectional view illustrating the plasma display panel apparatus according to the third embodiment of the present invention.

FIG. 8 and FIG. 9 illustrate plan views of a PDP apparatus according to a third embodiment of the present invention. FIG. 10 illustrates a sectional view of a film-type filter applied to the PDP apparatus according to the third embodiment of the present invention. FIG. 11 illustrates a sectional view of the PDP apparatus according to the third embodiment of the present invention.

The PDP apparatus according to the third embodiment of the present invention is characterized in that a ground layer 400 is formed on the panel 320 and located near film-type filters 301 and 302, and the film-type filters 301 and 302 are electrically connected to the ground layer 400 via a grounding member 202.

Referring to FIG. 8, the filter 301 is attached to a front side of the panel 320 having a display region and a non-display region therein.

The ground layer 400 is formed on a side of the panel 320 and a part of the ground layer 400 and a part of the filter 301 are electrically connected to each other via the grounding member 202.

The ground layer 400 is made of a transparent conductive metal such as indium tin oxide (ITO) and charges accumulated on the filter 301 are released out through the grounding member 202 and the ground layer 400.

In this instance, the grounding member 202 is preferably electrically connected to a part of the filter 301, where the part is disposed in the non-display region of the panel 320. The configuration described above does not degrade contrast of the panel by not covering the display region of the panel 320.

The grounding member 202 is made of a conductive metal such as silver (As) and copper (Cu) like the first and second embodiments, and is implemented by a conductive tape having a resistance in the range from 0.1 to 1000Ω so that charges accumulated on the panel 320 can be discharged out.

In this instance, the ground layers 400, 400a and 400b and the grounding members 202, 202a and 202b for electrically connecting the ground layers 400, 400a and 400b to the filters 301 and 302 can be formed on one or more sides of the panel in the non-display region of the panel. As illustrated in FIG. 8, the ground layer 400 and the grounding member 202 can be formed on a side of the panel 302. Alternatively, as illustrated in FIG. 9, the ground layers 400a and 400b and the grounding members 202a and 202b can be formed on both sides of the panel 320.

FIG. 10 illustrates a sectional view of the film-type filter 301 and 302 applied to the PDP apparatus according to the third embodiment of the present invention. FIG. 11 illustrates a sectional view of the PDP apparatus to which the film-type filter shown in FIG. 10 is fixed.

Referring to FIG. 10, the film-type filters 301 and 302 applied to the PDP apparatus according to the third embodiment includes one or more films selected among an NIR shielding film 321, an electromagnetic wave shielding film 322, an optical characteristic film 323 and an AR film 324. Detailed description on the each film will be omitted.

However, the NIR shielding film 321 and the electromagnetic shielding film 322 of the film-type filters 301 and 302 have a smaller size than the other films 323 and 324. Accordingly, when the films are stacked, the filters 301 and 302 may have a groove on a side, for example a lower side, thereof and the ground layer 400 is interlocked with the groove.

That is, the groove is formed by the films near the panel 320. Accordingly, the groove forming films may vary according to the order of the stacked films constituting the filter.

Further, the ground layer 400 is formed by depositing transparent conductive metal particles on the non-display region adjacent to the display region of the panel 320, and a thickness of the ground layer 400 is preferably the same as a width of the groove. In this embodiment, the thickness of the ground layer and the width of the groove are preferably not greater than 1 μm.

Accordingly, as illustrated in FIG. 11, in the filter 301 according to the third embodiment, the films near the panel 320 are smaller than the other films far from the panel 320, and thus the groove is formed in the filter 301. Further, the ground layer 400 is formed on the non-display region of the panel and structured to be interlocked with the groove.

Since the ground layer 400 and the filter 301 are electrically connected to each other via the grounding member 202 shaped like an upside-down L, charges accumulated on the filter can be released out and the filter 301 is fixed to the panel 320.

Figure 12:
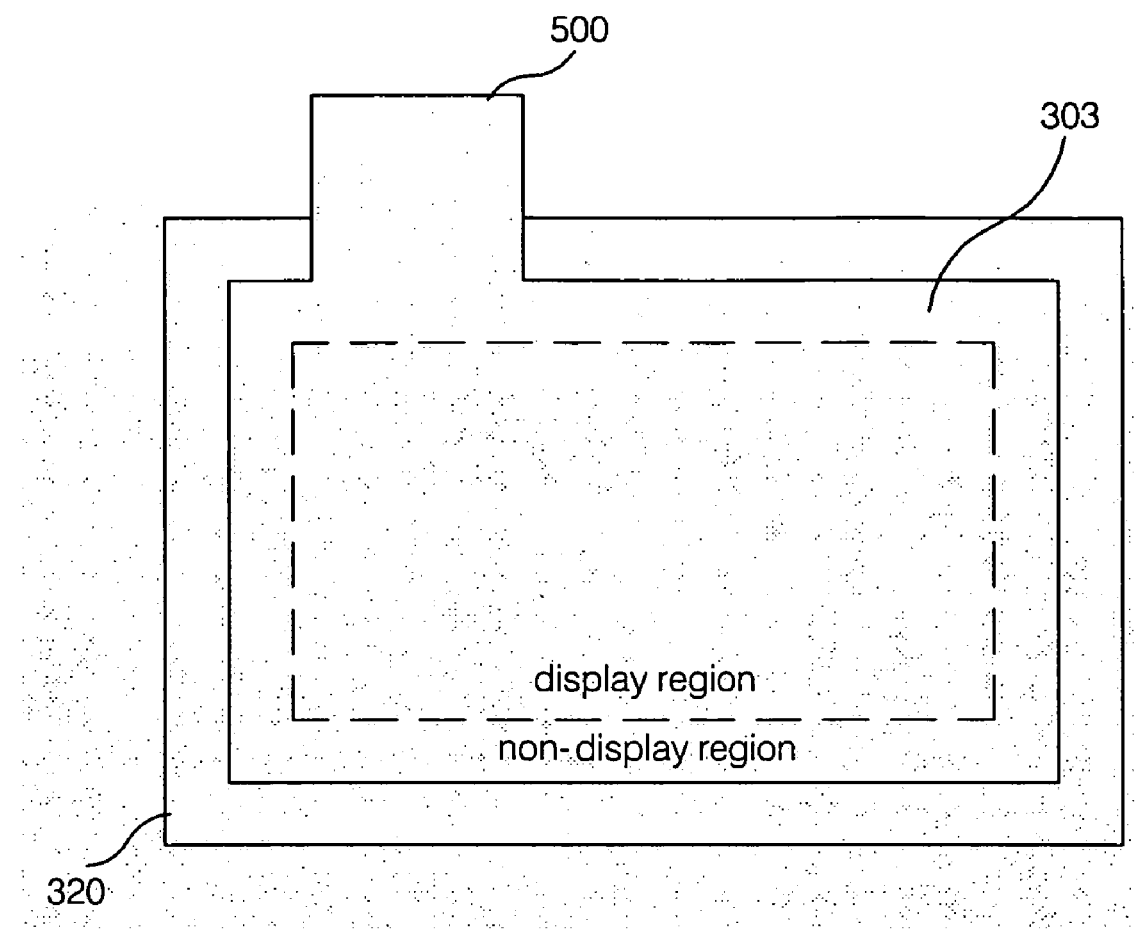
FIG. 12 is a plan view illustrating a plasma display panel apparatus according to a fourth embodiment of the present invention.
Figure 13:
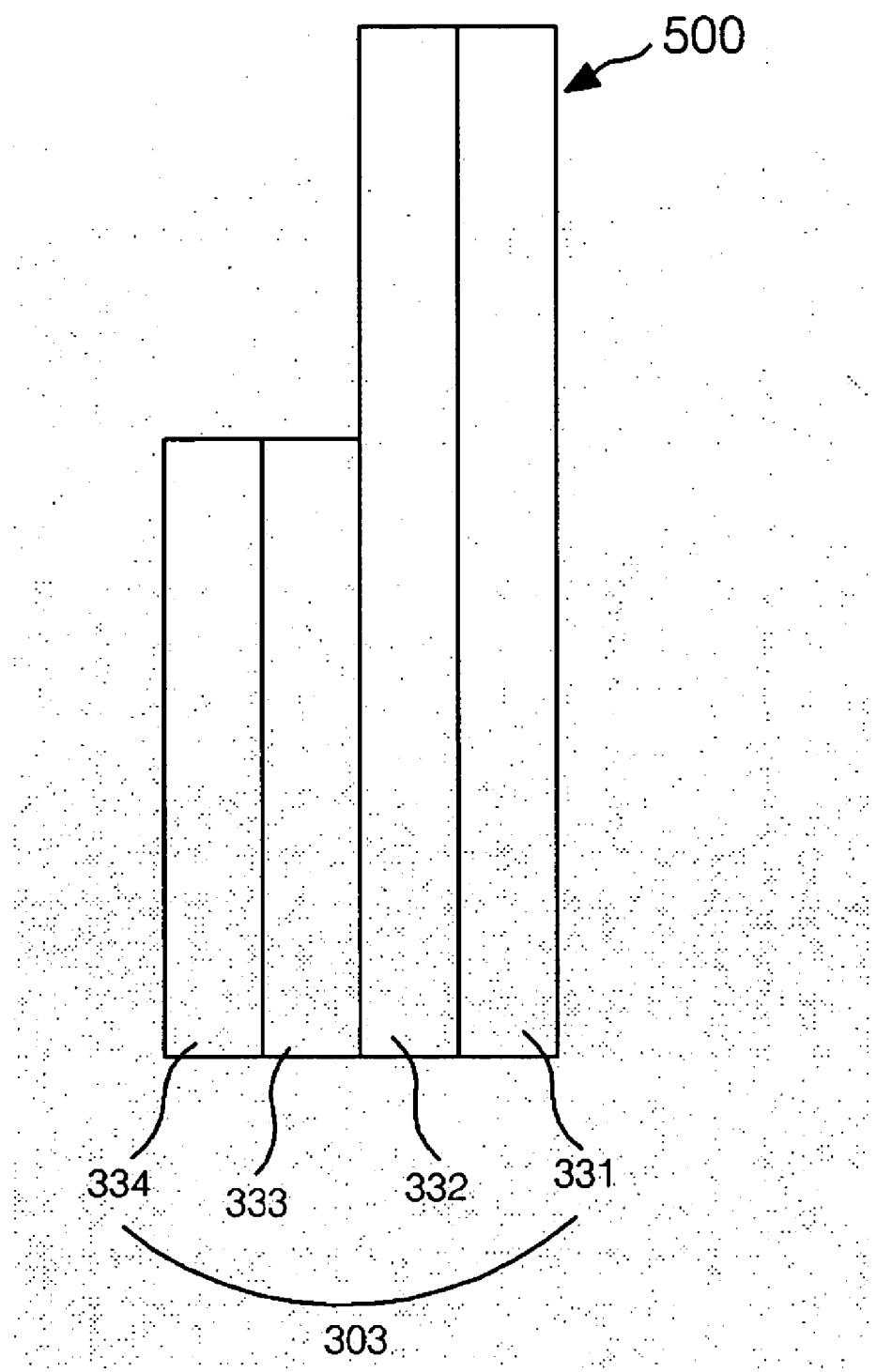
FIG. 13 is a sectional view illustrating a filter applied to the plasma display panel apparatus according to the fourth embodiment of the present invention.
Figure 14:
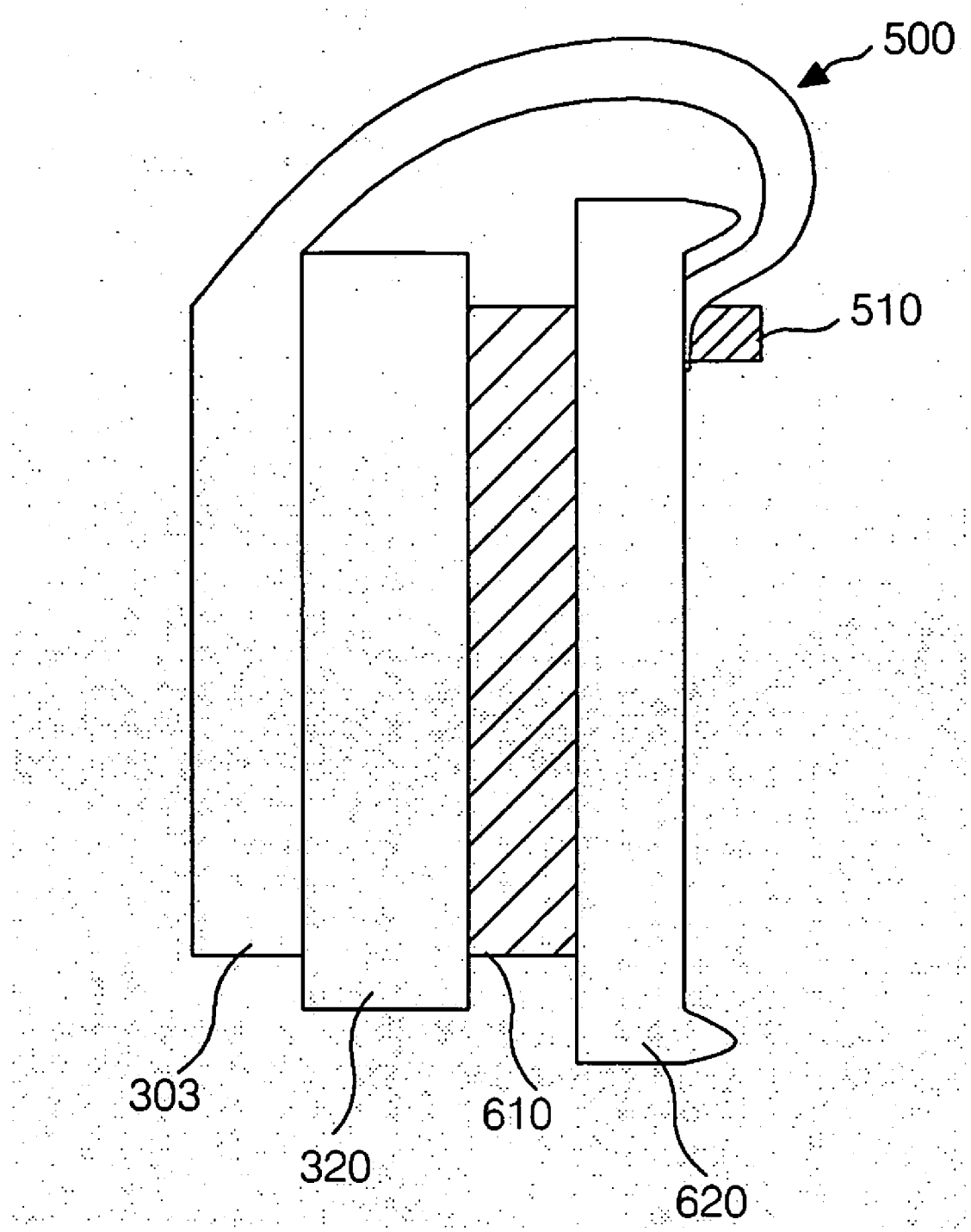
FIG. 14 is a sectional view provided for explaining the plasma display panel apparatus according to the fourth embodiment of the present invention.

FIG. 12 to FIG. 15 illustrates a PDP apparatus according to a fourth embodiment of the present invention. FIG. 12 is a plan view illustrating a structure of a filter, and FIG. 13 and FIG. 14 are sectional views illustrating the section of the filter.

The filter 303 according to the fourth embodiment of the present invention has a projected part 500 structured such that one or more films among films constituting the filter 303 are more extended outward at an edge portion thereof compared to the other films. The projected part 500 of the filter 303 acts like the grounding members 200, 201 and 202 in the first to third embodiments. The projected part 500 is in contact with a heat sink frame 520 disposed on a rear side of the panel.

Referring to FIG. 12 and FIG. 13, the film-type filter 303 according to the fourth embodiment of the present invention is structured to include the projected part 500 in addition to the main body part. That is, the film-type filter 303 comprises the main body part and the projected part.

As illustrated in FIG. 13, the film-type filter 303 includes one or more films selected among an NIR shielding film 331, an electromagnetic wave shielding film 332, an optical characteristic film 333 and an AR film 334. Detailed description on these films may be omitted.

As described above, one or more films of the film-type filter 303 applied to the PDP apparatus according to the fourth embodiment of the present invention has/have the projected part 500 which is formed as one or more films are structured to have a larger size than the others. The projected part 500 extends to have a length as long as that the projected part 500 can be in contact with the rear side of the panel 320 so that it is electrically grounded to the heat sink frame 620.

Referring to FIG. 14, the filter 303 having the projected part 500 are combined with the panel 320 such that the filter 303 is applied to a front side of the panel 320 and a heat sink sheet 610 for transmitting heat generated from the panel to a heat sink plate and a heat sink frame 620 for radiating the heat are applied to a rear side of the panel 320.

The filter 303 on one or more sides of the panel has the projected part 500 which is in contact with the heat sink frame 620.

The PDP apparatus further includes a fixing member 510 for fixing the projected part 500 to the heat sink frame 620, and it is made of a conductive metal such as silver (Ag) and copper (Cu). The fixing member 50 is formed as a conductive tape having a resistance in the range from 0.1 to 1000Ω so that charges accumulated on the panel 320 can be effectively released.

Figure 15A:
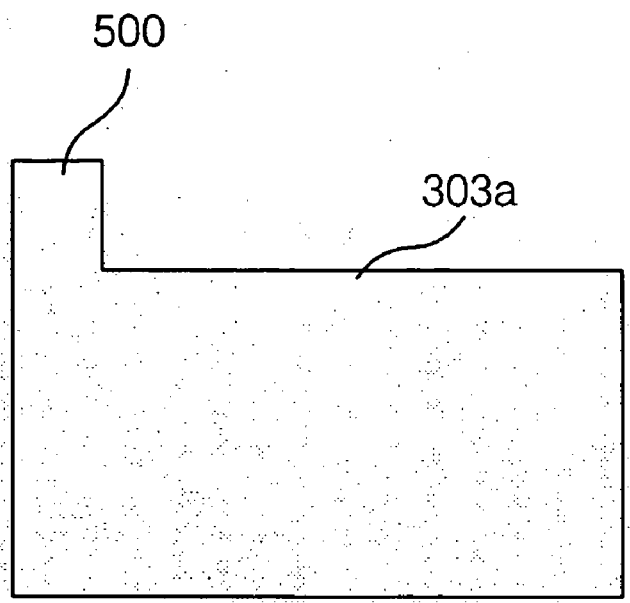
FIGS. 15A to 15C are plan views for explaining examples of a projected part of a filter applied to the plasma display panel apparatus according to the fourth embodiment of the present invention.
Figure 15B:
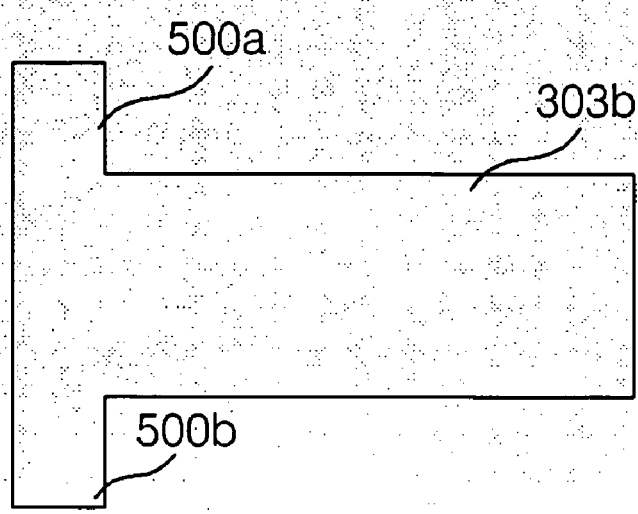
Figure 15C:
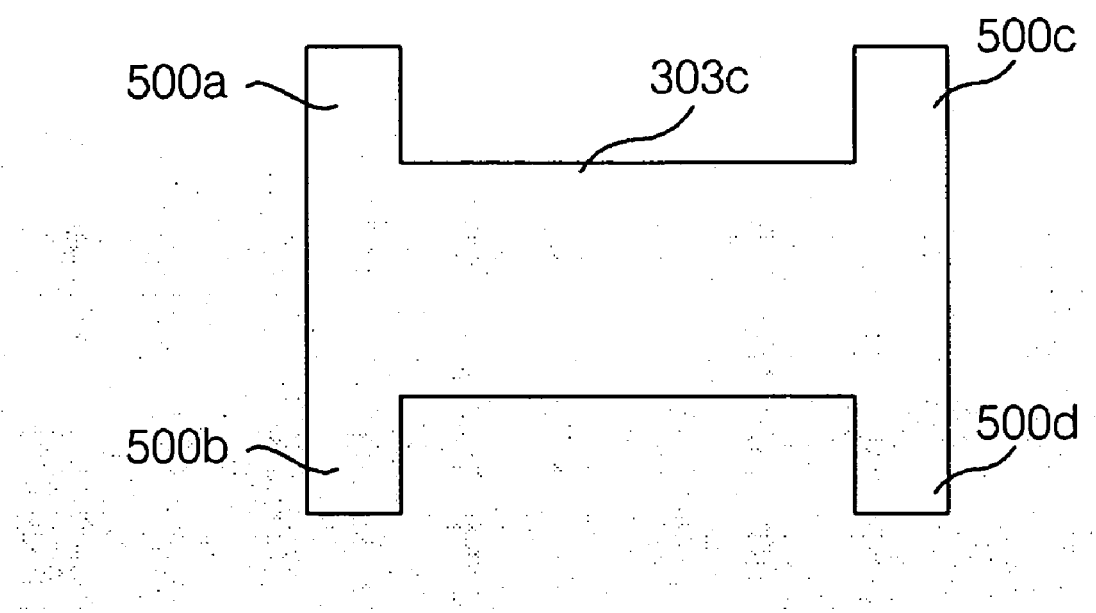

FIG. 15A to FIG. 15C illustrate the filter 303 in which the projected part 500 is extended from an edge portion of a main body part of the filter in various ways.

Referring to FIG. 15A, the projected part 500 is extended from a left upper corner of the main body part of the filter 303a, so that the projected part 500 covers an upper portion of the panel 320 and is contact with the heat sink frame 620 (shown in FIG. 14). The projected part 500 also can be disposed at a right upper corner of the main body part of the filter 303a.

Referring to FIG. 15B, there are more than one projected parts 500a and 500b disposed at a left upper corner and a left lower corner of a main body part of a filter 303b, respectively. Accordingly, the projected parts 500a and 500b cover an upper portion and a lower portion of the panel 320 and are contact with the heat sink frame 620 (shown in FIG. 14).

Referring to FIG. 15C, the projected parts 500a to 500d are disposed at a left upper corner, a left lower corner, a right upper corner and a right lower corner of a main body part of a filter 303c, respectively. The projected parts 500a to 500d cover an upper portion and a lower portion of the panel and are in contact with the heat sink frame 620 (shown in FIG. 14). The projected parts can be disposed at a middle edge portion of the main body part of the filter, or formed to be extended from the entire side edge of the main body part of the filter.

As described above, since the filter 303 according to the fourth embodiment includes at least one projected part and charges accumulated on the filter 303 are released out through the projected part 500, grounding and fixing of the film-type filter to the panel is accomplished without the grounding members 200, 201 and 202 and the ground layer 400 which are required in the first to third embodiments.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A plasma display panel apparatus, comprising:
    a panel having a display region and a non-display region;
    a film-type filter provided on the panel; and
    a grounding member that electrically connects the non-display region of the panel to the filter and that fixes the filter to the panel, wherein the grounding member comprises a conductive tape containing a conductive metal substance and having a resistance in the range from 0.1 to 1000Ω.

2. The plasma display panel apparatus according to claim 1, wherein the filter comprises one or more films selected among an AR film, an optical characteristic film, an electromagnetic wave shielding film and an NIR shielding film.

3. A plasma display panel apparatus, comprising:
    a panel having a display region and a non-display region;
    a film-type filter provided on the panel;
    a ground layer provided on the non-display region of the panel, wherein a thickness of the ground layer is less than 1 μm; and
    a grounding member that electrically connects the filter to the ground layer and that fixes the filter to the panel.

4. The plasma display panel apparatus according to claim 1, wherein the ground layer is made of a transparent conductive metal such as ITO.

5. The plasma display panel apparatus according to claim 3, wherein the grounding member comprises a conductive tape containing a conductive metal substance.

6. The plasma display panel apparatus according to claim 3, wherein the filter comprises a groove that extends along a lower side edge thereof.

7. The plasma display panel apparatus according to claim 6, wherein at least one film among an AR film, an optical characteristic film, an electromagnetic wave shielding film and an NIR shielding film is smaller than the other films constituting the filter.

8. The plasma display panel apparatus according to claim 6, wherein a width of the groove is substantially the same as a thickness of the ground layer.

* * * * *